US006518720B1

(12) United States Patent
Frantz

(10) Patent No.: US 6,518,720 B1
(45) Date of Patent: Feb. 11, 2003

(54) COMBINATION DOOR UNLOCK AND TRUNK RELEASE MECHANISM

(75) Inventor: William T Frantz, San Diego, CA (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/692,734

(22) Filed: Oct. 19, 2000

(51) Int. Cl.[7] .......................... G05B 5/00; H02H 7/08; H02P 1/00; H02P 3/00; H02P 7/00

(52) U.S. Cl. ...................... 318/445; 318/452; 318/484; 70/264; 70/267

(58) Field of Search ............................... 318/440–489, 318/139, 280–289; 307/9–11; 191/2, 3, 4, 6; 477/99, 97; 340/825.31, 825.32, 540; 74/866, 861; 192/4 A, 4 C; 70/262, 268

(56) References Cited

U.S. PATENT DOCUMENTS

| | | | | | |
|---|---|---|---|---|---|
| 3,788,422 | A | * | 1/1974 | Bowler | 180/114 |
| 4,200,167 | A | * | 4/1980 | Cockman | 180/281 |
| 4,892,014 | A | * | 1/1990 | Morell et al. | 74/866 |
| 5,157,389 | A | * | 10/1992 | Kurozu et al. | 340/825.31 |
| 5,278,547 | A | * | 1/1994 | Suman et al. | 307/10.4 |
| 5,293,160 | A | * | 3/1994 | Kurozu et al. | 340/825.32 |
| 5,717,387 | A | * | 2/1998 | Suman et al. | 340/7.2 |
| 5,919,112 | A | * | 7/1999 | Michael et al. | 477/99 |
| 6,172,431 | B1 | * | 1/2001 | Honeyman | 180/287 |
| 6,182,807 | B1 | * | 2/2001 | Saito et al. | 191/2 |
| 2001/0004044 | A1 | * | 6/2001 | Sotome et al. | 200/5 R |
| 2001/0028241 | A1 | * | 10/2001 | Saito et al. | 323/282 |

* cited by examiner

*Primary Examiner*—Robert E. Nappi
*Assistant Examiner*—Edgardo San Martin
(74) *Attorney, Agent, or Firm*—Laura C. Hargitt

(57) ABSTRACT

A mechanism by which a single switch can either unlock one or more doors or release the trunk or hatch of an automotive vehicle. The switch can be mechanically or electrically associated with a door unlock button mounted on the door the automotive vehicle. Depressing the unlock button causes the switch to become active, and the door can be unlocked if switch is active for a time T1. The trunk can be opened if the switch is held in the active position for a predetermined period of time T2, provided the car is in park and the door associated with the switch is open.

20 Claims, 2 Drawing Sheets

COMBINATION DOOR UNLOCK AND TRUNK RELEASE MECHANISM

TECHNICAL FIELD

The present invention relates to a combination door unlock and remote trunk release switch. More particularly, the present invention relates to a combined remote trunk (or hatch) release or power door unlock switch, whereby one or more doors of an automotive vehicle can be unlocked if the door unlock switch associated with a particular door is active momentarily, or the trunk release motor can be activated if the power door unlock switch associated with one or more doors is driven active for a short period of time, provided the gear selector is in a non-driving gear and the door associated with the depressed unlock switch is open.

BACKGROUND OF THE INVENTION

Presently, the remote trunk release and power door unlock functions for an automotive vehicle are accomplished using separate switches. Generally, to unlock a single door of an automotive vehicle, a door unlock button can be located on the door panel, and the unlock button associated either mechanically or electrically, or both, with a door unlock switch. In most instances, depressing the unlock button drives the switch active, resulting in the activation of a door unlock motor electrically associated with the switch.

A trunk or hatch release button is typically located on the instrument panel or on the driver's door, and can be electrically or mechanically associated with a trunk release switch. Depressing the trunk or hatch release button typically drives the trunk or hatch release switch active. When the trunk or hatch release switch is active, a trunk or hatch release motor or solenoid electrically associated with the switch can be activated.

In view of the use of separate switches for controlling the door unlocking and trunk or hatch release functions, it may be desirable to have a single switch that can perform both the door unlocking and trunk or hatch release functions for an automotive vehicle.

SUMMARY OF THE INVENTION

The present invention is directed to a single door unlock switch for either unlocking the doors of an automotive vehicle or for releasing a trunk or hatch release. An unlock signal can be provided to a selected door or the trunk based on an evaluation of data input into a control module electrically associated with the switch.

The door unlock switch can be a normally open switch, wherein the door unlock switch can be mechanically or electrically associated with a door unlock button. Depressing the door unlock button can drive the switch active. If the door unlock button is pressed momentarily, causing the door unlock switch to become active, the power door unlock motors can be activated. Additionally, if the door unlock button for a selected door is pressed and held causing the door unlock switch to become active for a short period of time, the trunk release motor can be activated, provided the gear selector is in a non-driving gear and the door associated with the depressed door unlock button is open.

The combined door unlock and trunk release mechanism can include a single door unlock switch for either unlocking one or more doors of an automotive vehicle or releasing a trunk release latch, wherein the one or more doors and the trunk release latch are electrically associated with the door unlock switch; and a control module electrically associated with the one or more doors and the door unlock switch for monitoring the position of the one or more doors and the position of a gear selector of an automotive vehicle. More specifically, the door unlock switch can activate either a door unlock motor electrically associated with the switch or a trunk release motor electrically associated with the door unlock switch.

The control module can monitor the position of the door unlock switch, the position of the doors of the automotive vehicle and the position of the gear selector switch. The control module can also include a timer for measuring the length of time that the door unlock switch is in the active state. The timer can be electrically coupled to a clock memory device for comparing the actual depression time for the door unlock switch with preprogrammed length of depression time parameters. For example, the control module could send an unlock signal to the door unlock motor if the door unlock switch becomes active for a time T1, wherein the time T1 can be at least 350 ms. Additionally, the control module could send an unlock signal to the trunk release motor if the door unlock switch becomes active for time T2, wherein time T2 can be at least 2550 ms.

Further, the signal T2 may be sent to a switch delay circuit for further evaluation in view of certain preprogrammed activation parameters. For instance, a trunk release signal can be cancelled if the gear selector is in a non-driving gear and the door associated with the unlock switch is open.

Additionally, the combined door unlock and trunk release mechanism can be computer controlled. Consequently, the control module can include a computer readable medium containing program logic instructions for unlocking one or more doors of an automotive vehicle or releasing a trunk release latch. The program logic can include the following instructions:

instructions for monitoring whether a gear selector for the automotive vehicle is engaged in a drive or non-drive gear;

instructions for monitoring the position of the door associated with the active door unlock switch;

instructions for monitoring the length of depression time for the door unlock button or the door unlock switch;

instructions for activating a door unlock motor associated with a the door unlock button and the associated door unlock switch; and instructions for releasing a trunk release motor associated with the door unlock button and the active door unlock switch.

The program logic instructions can also include instructions for delaying activation of the door unlock motor or the trunk release motor, particularly where certain preprogrammed parameters are required to be evaluated in conjunction with an active door unlock switch signal. For instance, the position of the gear selector switch or the position of the doors of the automotive vehicle can be considered prior to sending an unlock signal to the trunk release motor. Additionally, the program logic instructions can include instructions for returning the control module to a standby state when the conditions for unlocking a selected door or for releasing the trunk are not met.

A method that can be used for either unlocking one or more doors or releasing a trunk release mechanism of an automotive vehicle can include the steps of:

providing a single door unlock switch for either unlocking at least one door of an automotive vehicle or for releasing a trunk release of the automotive vehicle, wherein the door and the trunk release are associated with the door unlock switch, and the door unlock switch can be driven active by engaging an associated door unlock button;

monitoring the position of a gear selector switch and the position of the door electrically associated with the door unlock switch; and providing an unlock signal to the door unlock motor associated with the door unlock switch or to a trunk release motor electrically associated with the door unlock switch in response to a control signal from an electronic control module electrically associated with the door unlock switch.

The method can also include the step of monitoring the length of time that the door unlock switch is held in the active state. For instance, the method could further include the steps of sending a door unlock signal to a door unlock motor associated with the door unlock switch when the door unlock switch is held active for a time T1 or sending a trunk release signal to the trunk release motor if the door unlock switch is held in the active state for a time T2, provided certain preprogrammed activation parameters, if specified, are met. The preprogrammed activation parameters can require the door associated with the door unlock switch to be open or the a gear selector of the automotive vehicle to be engaged in a non-drive gear before sending an unlock signal to the trunk release motor.

BRIEF DESCRIPTION OF THE DRAWINGS

The features and inventive aspects of the present invention will become more apparent upon reading the following detailed description, claims, and drawings, of which the following is a brief description:

DESCRIPTION OF THE PREFERRED EMBODIMENT

This invention relates to a single mechanism for unlocking the doors or remotely releasing a trunk (or hatch) latch of an automotive vehicle. For illustrative purposes, the combined door unlock and trunk release mechanism will be described in conjunction with the doors and trunk of an automotive vehicle. One of skill in the art will appreciate that the door unlock and trunk release mechanism can also be used to unlock a hatch release latch. One of skill in the art will further appreciate that separate door unlock switches can be associated with each door to be unlocked.

In its most general form, the combination door unlock and trunk release mechanism can include a door unlock switch electrically associated with an electronic control module. The electronic control module can monitor the position of the gear selector, the position of one or more doors and the position of the door unlock switch associated with a particular door. The electronic control module can control the activation of the trunk release motor and the door unlock motors in accordance with preprogrammed logic instructions upon depressing a single door unlock button.

In one embodiment, the control module can activate a trunk release motor or trunk release solenoid if the driver's door unlock button is pressed, driving an associated door unlock switch active for a short period of time, provided the gear selector is in park or another non-drive gear and the driver door associated with the is open; or the control module can also activate the driver's door unlock motor if the driver door unlock button is depressed so as to momentarily activate the associated door unlock switch.

Figure 1:
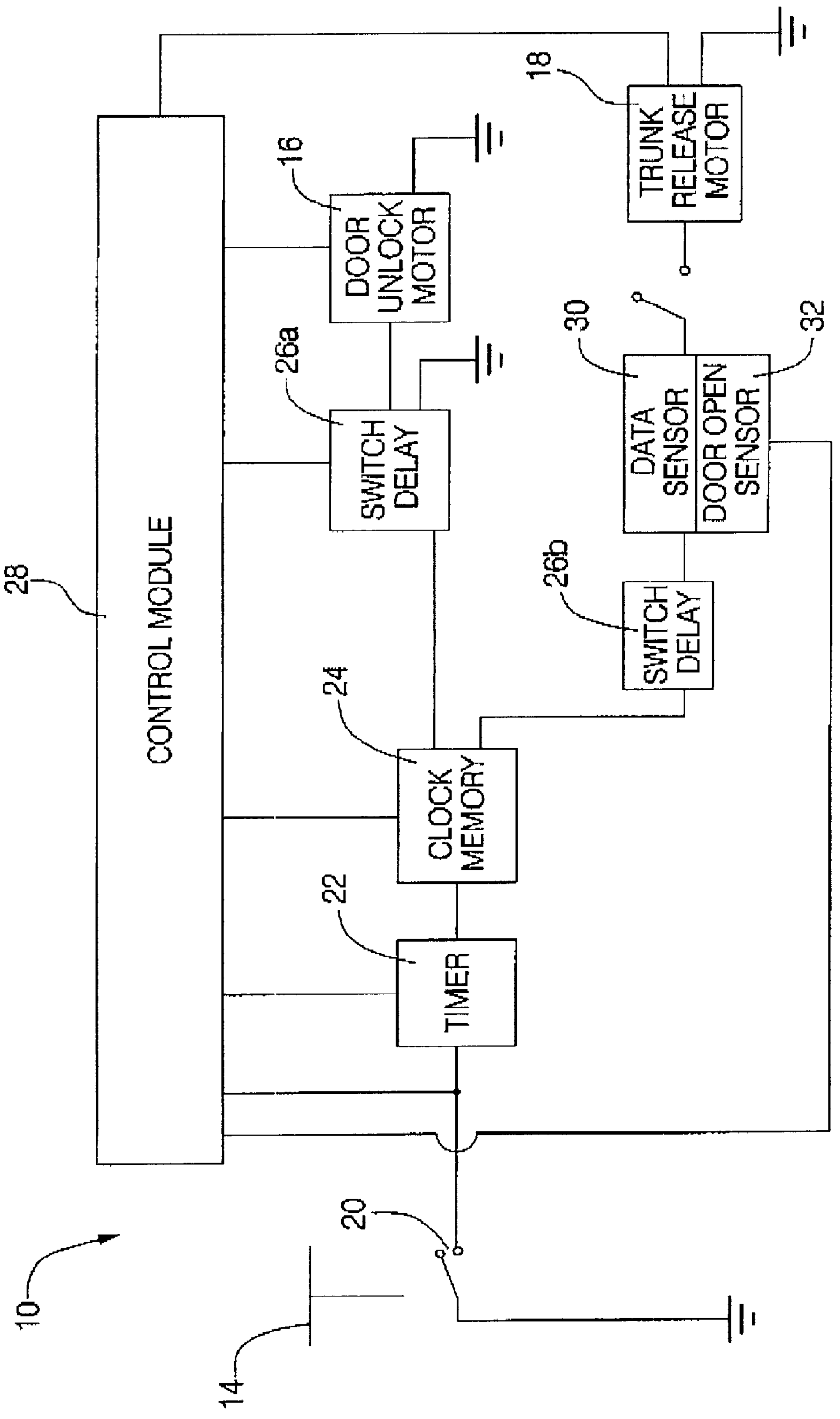
FIG. 1 is a block diagram of a schematic diagram of a combination door unlock and trunk release mechanism formed in accordance with the teachings of this invention.

FIG. 1 shows a block diagram of a combination door unlock and trunk release mechanism 10 formed in accordance with the teachings of this invention. One of skill in the art will appreciate that the doors to be unlocked can include front and rear driver side and passenger side doors or other doors of an automotive vehicle. One of skill in the art will further appreciate that the door unlock and trunk release devices to be unlocked or released are of the type conventionally used on automotive vehicles. These devices can be installed on the automotive vehicle using known techniques except as otherwise described herein.

The mechanism 10 can include an electrical apparatus 12 as well as software for controlling the operation of the electrical apparatus 12. For purposes of this disclosure, the discussion will be limited to a description of the mechanism 10 in operating the left and right front doors and a trunk release latch for an automotive vehicle.

Turning now to a discussion of the electrical apparatus 12, the electrical apparatus 12 can include a door unlock button 14, a power door unlock motor 16, a trunk release motor 18, a door unlock switch 20, a timer 22, an electronic control module 28, a serial data sensor 30 and a door open sensor 32.

FIG. 1 shows a block diagram of the circuitry that can be used to electrically or mechanically associate the elements of the apparatus 12, with several mechanical and electrical components shown schematically. One of skill in the art will appreciate that only a single door unlock switch 20 and unlock button 14 are shown in FIG. 1; however, one of skill in the art will readily understand that the circuitry can be modified to include unlock switches and buttons for each door. One of skill in the art will further appreciate that the unlock buttons and switches can be electrically wired such that a single switch and button combination can activate the unlock function for one or more doors as well as releasing the trunk latch.

The door unlock button 14 is of a type used in automotive vehicle door lock and unlocking systems. The door unlock button 14 can be installed on the automobile and into a conventional automotive vehicle door locking/unlocking system using techniques known to one of skill in the art.

One of skill in the art will also appreciate that the door unlock motor 16 and the trunk release motor 18 are conventional motors of the type used in typical door unlock and trunk release applications for an automotive vehicle. The door unlock motor 16 can be coupled to a conventional door unlock mechanism using techniques known to one of skill in the art. Likewise, the trunk release motor 18 can be coupled to a conventional trunk release mechanism also using techniques known to one of skill in the art. One of skill in the art will further appreciate that a conventional solenoid system can be used in place of the trunk release motor 18 to release the trunk latch, wherein the solenoid system can be installed and used according to known techniques.

The switch 20 is a conventional switch of the type generally known in the industry. In the disclosed embodiment, the switch 20 can be a normally open switch, and can be installed using conventional techniques. However, in practicing the invention, the switch 20 is installed so as to permit unlocking of an electrically associated door and the releasing of a trunk latch. One of skill in the art will appreciate that the switch 20 could be a normally closed switch or any other switch known in the industry, provided the switch can be activated upon manipulation of a door unlock button.

The timer 22 measures the length of time that the switch 20 is held active. One of skill in the art will appreciate that the timer 22 is also a commonly known element, and can be installed and used in accordance with generally known techniques.

The electronic control module 28 controls the activation of either the door unlock motor 16 or the trunk release motor 18. In the disclosed embodiment, the electronic control module can be a combination of conventional electronic components and logic switches, wherein the logic switches and the operation of certain electrical components can be computer controlled (discussed below). One of skill in the art will appreciate that the electronic control module 28 can be installed and programmed using conventional techniques.

The serial data sensor 30 monitors the transmission gear engagement function, and is a sensor of a type known in the industry. The serial data sensor 30 can provide either an active or inactive signal based upon predetermined parameters. In the disclosed embodiment, the serial data sensor 30 can be active if the automotive vehicle is in a non-driving gear such as park. The serial data sensor 30 can be inactive if the automotive vehicle is engaged in a driving gear such as Forward, Forward1, Forward2, etc. The serial data sensor 30 can permit an unlock signal to be sent to the trunk release motor 18 if the serial data sensor 30 signal is active.

One of skill in the art will further appreciate that the door open sensor 32 is of a type generally known in the field, and can be installed and used in accordance with generally known techniques. In the disclosed embodiment, the door open sensor 32 can be active if the associated door is open. Otherwise, the door open sensor 32 can be inactive.

Operation

For illustrative purposes only, depressing the button 14 closes the single normally open switch 20. Closing the switch 20 can cause the switch 20 to become active. Upon activating the switch 20, a signal can be sent to the timer 22, which measures the length of time that the switch 20 is held in the active state.

The signal from the timer 22 can be directed a clock memory 24. The clock memory 24 compares the "length of depression time" information received from the timer 22 with preprogrammed length of depression times stored in the clock memory 24. In the disclosed embodiment, the clock memory 24 can be programmed to recognize an active state for switch 20 if the door unlock button 14 is depressed, causing the switch 20 to remain active for a time T1. In the disclosed embodiment, the time T1 is 350 ms. Additionally, the clock memory 24 can be programmed to recognize a second active state for the switch 20 if the unlock button 14 is depressed, causing the switch 20 to remain active for a time T2, wherein time T2 is at least 2550 ms in the disclosed embodiment. One of skill in the art will appreciate that other length of depression time parameters can be used to control the active and inactive status of the switch 20.

One of skill in the art will also appreciate that in the disclosed embodiment holding the switch 20 active for time T1 can generate a signal that unlocks one or more doors associated with the switch 20. However, if the switch 20 is held active for longer than time T1, the switch 20 signal becomes inactive until the switch 20 is held active for a total elapsed time equal to T2. Once time T2 has elapsed, the switch 20 can cause the generation of a signal that permits releasing the trunk release motor 18 if other predetermined parameters are met (discussed below).

The length of depression time information from the clock memory 24 can be evaluated against other predetermined parameters prior to the generation of an unlock signal directed to either the door unlock motor 16 or the trunk release motor 18. Thus, in the disclosed embodiment, the clock memory 24 is electrically associated with a pair of switch delay circuits 26*a,* 26*b.*

The switch delay circuit 26*a* is associated with the door unlock function, and can remain in the switch delay state except under the following conditions: The door unlock switch 20 is inactive, a door open sensor 32 associated with the door whose unlock button 14 was depressed is inactive, the transmission is engaged in a driving gear (e.g., drive, reverse, etc.), or the timer 22 indicates that the door unlock switch 20 has not been held active for the preprogrammed length of depression time. If these conditions are met, the mechanism 10 can return to the standby state and can remain in such state unless the door unlock switch 14 becomes active, the open door sensor becomes active, and the transmission is not engaged in a driving gear (e.g., drive, reverse, etc.).

The switch delay circuit 26*b* associated with the trunk release function can remain in the switch delay state except under the following conditions: The door unlock switch 20 is inactive, a door open sensor 32 associated with the door whose unlock button 14 was depressed is inactive, the transmission is engaged in a driving gear, or the timer 22 indicates that the door unlock switch 20 has not been held for the preprogrammed length of depression time. If these conditions are met, the mechanism 10 can return to the standby state, and can remain in such state unless the door unlock switch 20 becomes active or an open door sensor 32 associated with the respective door becomes active, provided, in both instances, the serial data sensor 30 sensor is active (i.e., the transmission is not engaged in a driving gear).

If the switch delay parameters are not met, an unlock signal can be directed from the switch delay circuit 26*a,* 26*b* to either the power door unlock motor 16 or the trunk unlock motor 18, respectively. In the disclosed embodiment, a door unlock signal can be sent to the door unlock motor 16 if the door unlock button 14 is depressed momentarily, closing the switch 20 for at least 350 ms. An unlock signal can be sent to the trunk release motor 18 if the unlock button 14 is depressed and held for a short period of time, thus causing the switch 20 to remain closed for at least 2550 ms.

However, prior to sending an unlock signal to the trunk release motor 18, the signal is evaluated against the signal from the serial data sensor 30 and the door open sensor 32. In the disclosed embodiment, if the separate signals from both the serial data sensor 30 and the door open sensor 32 are active, an unlock signal can be directed to the trunk release motor 18. One of skill in the art will appreciate that the serial data sensor 30 and the open door sensor 32 can be omitted from the mechanism 10 without affecting the ability of the mechanism 10 to send an unlocking signal to the trunk release motor 18.

One of skill in the art will further appreciate that evaluation of the signals from the serial data sensor 30 and the open door sensor 32, as well as the signals from the aforementioned components, can be evaluated against certain logic instructions executed by a computer or microprocessor.

Discussion of the Software Aspects of Mechanism 10

Turning now to a discussion of the software aspects of the mechanism 10, the mechanism 10 includes an electronic control module 28 for executing the program logic instructions. The electronic control module 28 can include the following interface parameters and logic instructions, which one of skill in the art will appreciate can vary depending on the structure (e.g., number of doors to be controlled) of the automotive vehicle. For illustrative purposes, the operation of the electronic control module 28 will be described with reference to a left front door and a right front door.

Input Description

LFOPEN—Left Front Door Open Switch

The control module 28 can provide an interface to a left front door open switch 32. This input can be a connection to ground that is active when the left front door is open. The switch 32 can be inactive when this condition is not met.

LFUNLKSW—Left Front Door Unlock Switch

The control module 28 can provide an interface to a left front door unlock switch 20. This input can be a momentary connection to ground that is active when the left front door unlock switch 20 is closed (or the left front door unlock button 14 is depressed). This input can be inactive when the switch 20 is open, i.e., the button 14 is not depressed.

RFOPEN—Right Front Door Open Switch

The control module 28 can provide an interface to a right front door open switch 32. This input can be a connection to ground that is active when the right front door is open. The switch 32 can be inactive when this condition is not met.

RFUNLKSW—Right Front Door Unlock Switch

The control module 28 can provide an interface to a right front door unlock switch 20. This input is a momentary connection to ground that is active when the right front door unlock switch 20 is closed (or the right front door unlock button 14 is depressed). This input can be inactive when the switch 20 is open, i.e., the button 14 is not depressed.

Serial Data—Transmission/Transaxle/PRNDL 30—Estimated Trans Gear Engaged

The control module 28 can receive the transmission gear engaged information via a serial data sensor 30, which sends a serial data message from a transmission control module to the control module 28. The transmission gear engaged status can be encoded in the serial data message per the following table.

Data Definition (Reports and Loads only)
Transmission Actual Gear-State Encoded (8 bits)

| State | Support | State Description |
|---|---|---|
| 00 | Receive | Invalid |
| 01 | Receive | REVERSE |
| 02 | Receive | FORWARD1 |
| 04 | Receive | FORWARD2 |
| 08 | Receive | FORWARD3 |
| 10 | Receive | FORWARD4 |
| 20 | N/A | N/A |
| 40 | Receive | PARK |
| 80 | Receive | NEUTRAL |

Output Description

TRUNKMTR—Trunk Release Motor

The control module 28 can provide an interface to a trunk release motor 18 allowing the trunk to be unlatched. This output is designed to drive the trunk release motor 18 directly. The trunk release motor 18 can release the trunk lid when the TRUNKMTR output is driven active.

UNLOCK—Door Unlock Motors

The control module 28 can provide an interface to one or more door lock motors 16, allowing one or more to be unlocked. This output is designed to drive the door lock motors 16 directly. The door lock motors can unlock the doors when the UNLOCK output is driven active.

Functional Description

Figure 2:
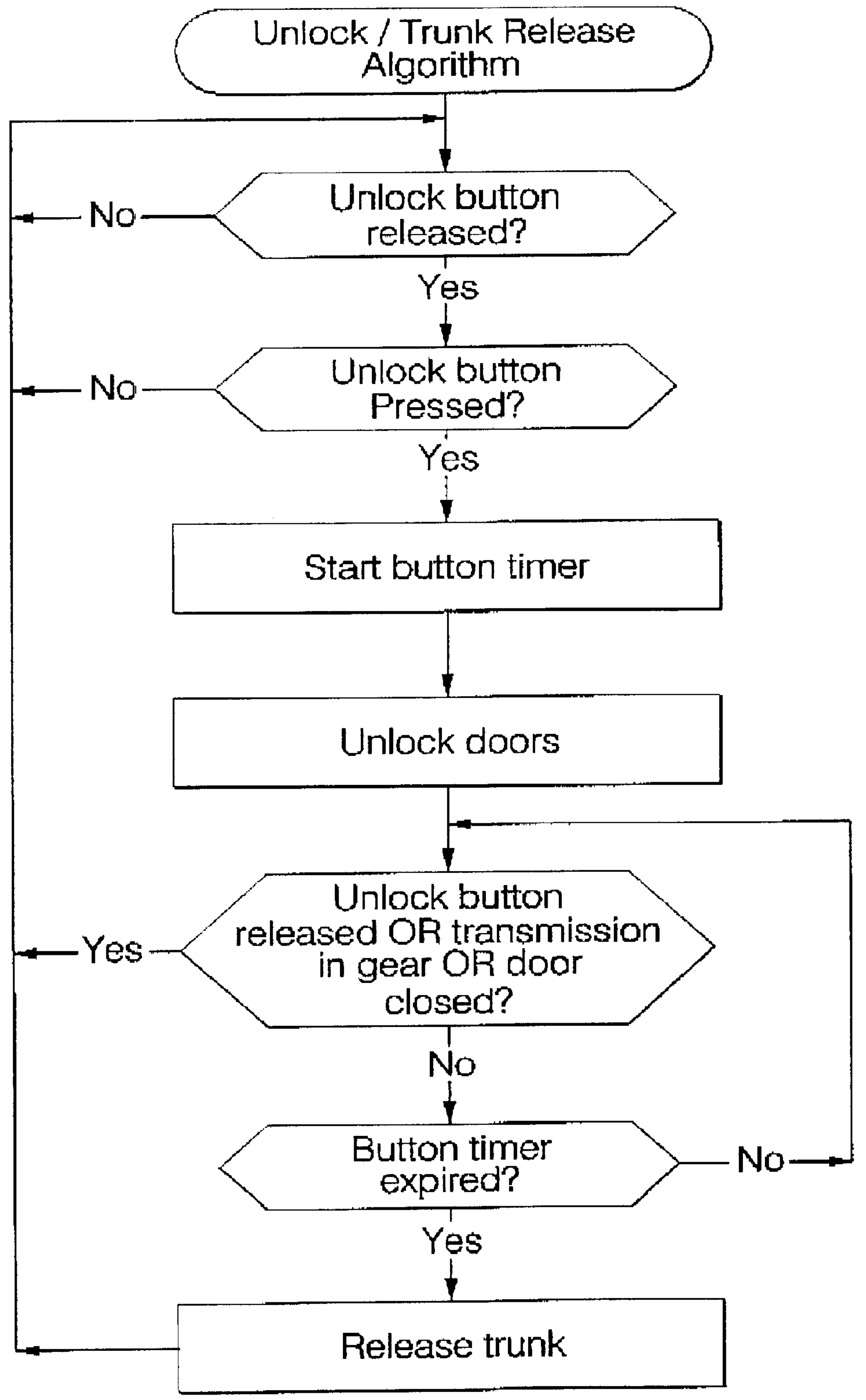
FIG. 2 is a flow chart showing a logic sequence for controlling the operation of the combination door unlock and trunk release mechanism shown schematically in FIG. 1.

In general, the door unlock and trunk release algorithm can follow the flowchart shown in FIG. 2. The sequence shown in FIG. 2 can be summarized as follows: control of the trunk release motor 18 and the door unlock motor 16 is primarily accomplished by four independent functions: (1) The All Door Unlock function drives the door lock motor 16 to unlock the doors when either door unlock switch 20, e.g., right front/left front, is active (i.e., the switch 20 is closed). (2) The Trunk Release function drives the trunk (or hatch) release motor 18 when requested by either the Trunk Release Left Front function or the Trunk Release Right Front function. (3) The Trunk Release Left Front function requests a trunk release if the left front unlock switch 20 is held active while the left front door is open and the vehicle is not in gear, and (4) the Trunk Release Right Front function requests a trunk release if the right front unlock switch is held active while the right front door is open and the vehicle is not in gear.

The program logic and the program code for controlling the operation of the mechanism 10 can be written in C++ or another similar compiler language, and can be recorded onto and retrieved from a conventional computer readable medium such as a magnetic or digital tape, magnetic floppy disk, magnetic hard disk drive, a CD-ROM or any other suitable computer readable device.

The program logic instructions can include the followings parameters and instructions.

All Door Unlock

The All Door Unlock function can have the following characteristics shown in Table 1:

Memory Requirements

TABLE 1

| Variable Name | Memory | Data Description | ROM default |
|---|---|---|---|
| UNLOCK_all_door_unlock | RAM | inactive, active | Inactive |
| Data_unlock_motor | EEPROM | 0–510 ms | 350 ms |
| Data_sleep_inhibit_all_door_unlock | RAM | inactive, active | Inactive |

State Machine Specification

Initial Transition transition to the STANDBY state

ALL DOOR UNLOCK state

Actions

When in the ALL DOOR UNLOCK state, the control module can have the following characteristics:

SET UNLOCK=active start timer_unlock at data_unlock_motor

Next State

The control module can remain in the ALL DOOR UNLOCK state except under the following conditions:

A.

IF timer_unlock

THEN transition to the STANDBY state

STANDBY state

Actions

When in the STANDBY state, the control module can have the following characteristics:

SET UNLOCK=inactive

Next State

The control module can remain in the STANDBY state except under the following conditions:

A.

IF LFUNLKSW=inactive TO active

THEN transition to the ALL DOOR UNLOCK state

B.

IF RFUNLKSW=inactive TO active

THEN transition to the ALL DOOR UNLOCK state

Trunk Release

The Trunk Release function can have the following characteristics shown in Table 2:

Memory Requirements

TABLE 2

| Variable Name | Memory | Data Description | ROM default |
|---|---|---|---|
| data__trunk__release__motor | EEPROM | 0–510 ms | 350 ms |
| Timer__trunk__release | RAM | 0-data__trunk__release__motor ± 10 ms | 0 ms |

State Machine Specification

Initial Transition transition to the STANDBY state

STANDBY state

Actions

When in the STANDBY state, the control module can have the following characteristics:

SET TRUNKMTR=inactive

Next State

The control module can remain in the STANDBY state except under the following conditions:

A.

IF TRUNKMTR__left__front

THEN transition to the TRUNK RELEASE state

B.

IF TRUNKMTR__right__front

THEN transition to the TRUNK RELEASE state

TRUNK RELEASE state

Actions

When in the TRUNK RELEASE state, the control module can have the following characteristics:

SET TRUNKMTR=active start timer__trunk__release at data__trunk__release__motor

Next State

The control module can remain in the TRUNK RELEASE state except under the following conditions:

A.

IF timer__trunk__release

THEN transition to the STANDBY state

Trunk Release Left Front

The Trunk Release Left Front function can have the following characteristics shown in Table 3:

Memory Requirements

TABLE 3

| Variable Name | Memory | Data Description | ROM default |
|---|---|---|---|
| data__trunk__release__unlocksw | EEPROM | 0–5100 ms | 2550 ms |
| Timer__door__switch | RAM | 0-data__trunk__release__unlocksw ± 50 ms | 0 ms |

State Machine Specification

Initial Transition transition to the STANDBY state

SWITCH DELAY state

Actions

When in the SWITCH DELAY state, the control module can have the following characteristics:

start timer__door__switch at data__trunk__release__unlocksw

Next State

The control module can remain in the SWITCH DELAY state except under the following conditions:

A.

IF LFUNLKSW=inactive OR LFOPEN=inactive OR CLASS2IN__3A03__estimated__trans__gear__engaged=(FORWARD1 OR FORWARD2 OR FORWARD3 OR FORWARD4 OR REVERSE)

THEN transition to the STANDBY state

B.

IF timer__door__switch

THEN SET TRUNKMTR__left__front transition to the STANDBY state

STANDBY state

Actions

When in the STANDBY state, the control module can have the following characteristics:

NONE

Next State

The control module can remain in the STANDBY state except under the following conditions:

A.

IF LFUNLKSW=(inactive TO active) AND LFOPEN=active AND CLASS2IN__3A03__estimated__trans__gear__engaged≠(FORWARD1 OR FORWARD2 OR FORWARD3 OR FORWARD4 OR REVERSE)

THEN transition to the SWITCH DELAY state

Trunk Release Right Front

The Trunk Release Right Front function can have the following characteristics shown in Table 4:

Memory Requirements

TABLE 4

| Variable Name | Memory | Data Description | ROM default |
|---|---|---|---|
| Data__trunk__release__unlocksw | EEPROM | 0–5100 ms | 2550 ms |
| Timer__door__switch | RAM | 0-data__trunk__release__unlocksw ± 50 ms | 0 ms |

State Machine Specification

Initial Transition transition to the STANDBY state

SWITCH DELAY state

Actions

When in the SWITCH DELAY state, the control module can have the following characteristics:

start timer__door__switch at data__trunk__release__unlocksw

Next State

The control module can remain in the SWITCH DELAY state except under the following conditions:

A.

IF RFUNLKSW=inactive OR RFOPEN=inactive OR CLASS2IN__3A03__estimated__trans__gear__engaged=(FORWARD1 OR FORWARD2 OR FORWARD3 OR FORWARD4 OR REVERSE)

THEN transition to the STANDBY state

B.

IF timer__door__switch

THEN SET TRUNKMTR__left__front transition to the STANDBY state

STANDBY state

Actions

When in the STANDBY state, the control module can have the following characteristics:

NONE

Next State

The control module can remain in the STANDBY state except under the following conditions:

A.

IF RFUNLKSW=(inactive TO active) AND RFOPEN=active AND CLASS2IN__3A03__estimated__trans__gear__engaged≠(FORWARD1 OR FORWARD2 OR FORWARD3 OR FORWARD4 OR REVERSE)

THEN transition to the SWITCH DELAY state

A preferred embodiment of the present invention has been disclosed. A person of ordinary skill in the art would realize, however, that certain modifications would come within the teachings of this invention. Therefore, the following claims should be studied to determine the true scope and content of the invention.

What is claimed is:

1. A combined door unlock and trunk release mechanism, comprising:

a single switch capable of unlocking one or more doors of an automotive vehicle first and then releasing a trunk release latch, wherein the one or more doors and the trunk release latch are electrically associated with the switch; and a control module electrically associated with the one or more doors and the switch for monitoring the position of the one or more doors and the position of a gear selector of an automotive vehicle.

2. The combined door unlock and trunk release mechanism as defined in claim 1, wherein the switch can activate either a door unlock motor electrically associated with the switch or a trunk release motor electrically associated with the switch.

3. The combined door unlock and trunk release mechanism as defined in claim 2, wherein the switch can be electrically associated with a hatch release motor rather than a trunk release motor.

4. The combined door unlock and trunk release mechanism as defined in claim 1, wherein the switch is a normally open switch, wherein the switch can be mechanically or electrically associated with a door unlock button and the switch driven active when the door unlock button is depressed.

5. The combined door unlock and trunk release mechanism as defined in claim 1, wherein the control module includes a timer for measuring the length of time that the door unlock switch is in the active state.

6. The combined door unlock and trunk release mechanism as defined in claim 5, wherein the timer is electrically coupled to a clock memory device for comparing the actual length of switch depression time to preprogrammed length of depression time parameters for the switch.

7. The combined door unlock and trunk release mechanism as defined in claim 6, wherein the control module can send an unlock signal to the door unlock motor if the door unlock switch becomes active for a time T1.

8. The combined door unlock and trunk release mechanism as defined in claim 6, wherein the control module can send an unlock signal to the trunk release motor if the door unlock switch becomes active for a time T2.

9. The combined door unlock and trunk release mechanism as defined in claim 8, wherein the control module can send an unlock signal to the trunk release motor if the gear selector is in a non-driving gear or the door associated with the unlock switch is open.

10. The combined door unlock and trunk release mechanism as defined in claim 1, further including a door open sensor associated with the one or more doors.

11. The combined door unlock and trunk release mechanism as defined in claim 1, wherein the control module monitors the position of the switch.

12. A combined door unlock and trunk release mechanism, comprising:

a door unlock button for controlling the unlocking of at least one door of an automotive vehicle associated with the door unlock button and the release of a trunk release latch associated with the door unlock button; and a control module electrically coupled to a switch associated with the door unlock button, wherein the switch can be driven active if the door unlock button is depressed, the control module including a computer readable medium containing program logic instructions for unlocking said one or more doors or said trunk release, the program logic instructions including:

instructions for monitoring whether a gear selector for the automotive vehicle is engaged in a drive or non-drive gear;

instructions for monitoring the position of the door;

instructions for monitoring the length of depression time for the door unlock button or the switch;

instructions for activating a door unlock motor associated with the door unlock button for the one or more doors; and instructions for releasing a trunk release motor associated with the door unlock button, wherein an unlock signal can be sent to either the door unlock motor if the switch is active or the trunk release motor if the switch is active, and if the automotive vehicle is engaged in a non-drive gear and the door associated with the switch is open.

13. The door unlock and trunk release mechanism as defined in claim 12, wherein the program logic instructions further include instructions for delaying activation of the door unlock motor or the trunk release motor.

14. The door unlock and trunk release mechanism as defined in claim 12, wherein the program logic instructions further include instructions for returning the control module to a standby state.

15. The door unlock and trunk release mechanism as defined in claim 12, wherein the door unlock button can be associated with a hatch release mechanism or hatch release motor rather than a trunk release and trunk release motor.

16. A method for unlocking one or more doors and releasing a trunk release mechanism of an automotive vehicle using a single switch, comprising the steps of:

providing a single switch capable of unlocking at least one door of an automotive vehicle and releasing a trunk release latch of the automotive vehicle, wherein the door and the trunk release latch are associated with the switch and the switch can be driven active by engaging an associated door unlock button;

monitoring the position of a gear selector switch and the position of the door electrically associated with the switch; and providing an unlock signal to the door unlock motor associated with the switch or to a trunk release motor electrically associated with the switch in response to a control signal from an electronic control module.

17. The method as defined in claim 16, further including the step of monitoring the length of time that the switch is held in the active state.

18. The method as defined in claim 17, further including the step of sending a door unlock signal to a door unlock motor associated with the switch when the switch is held active for a time T1.

19. The method as defined in claim 17, further including the step of sending a trunk release signal to the trunk release motor if the switch is held in the active state for a time T2, and if the door associated with the switch is open or the gear selector switch of the automotive vehicle is not engaged in a drive gear.

20. The method as defined in claim 16, wherein the door unlock switch can be associated with a hatch release mechanism or hatch release motor rather than a trunk release mechanism and trunk release motor.

* * * * *